Dec. 30, 1952 W. M. SMITH 2,623,699
RELAY OPERATED TEMPERATURE RESPONSIVE CONTROL SYSTEM
Filed July 1, 1949
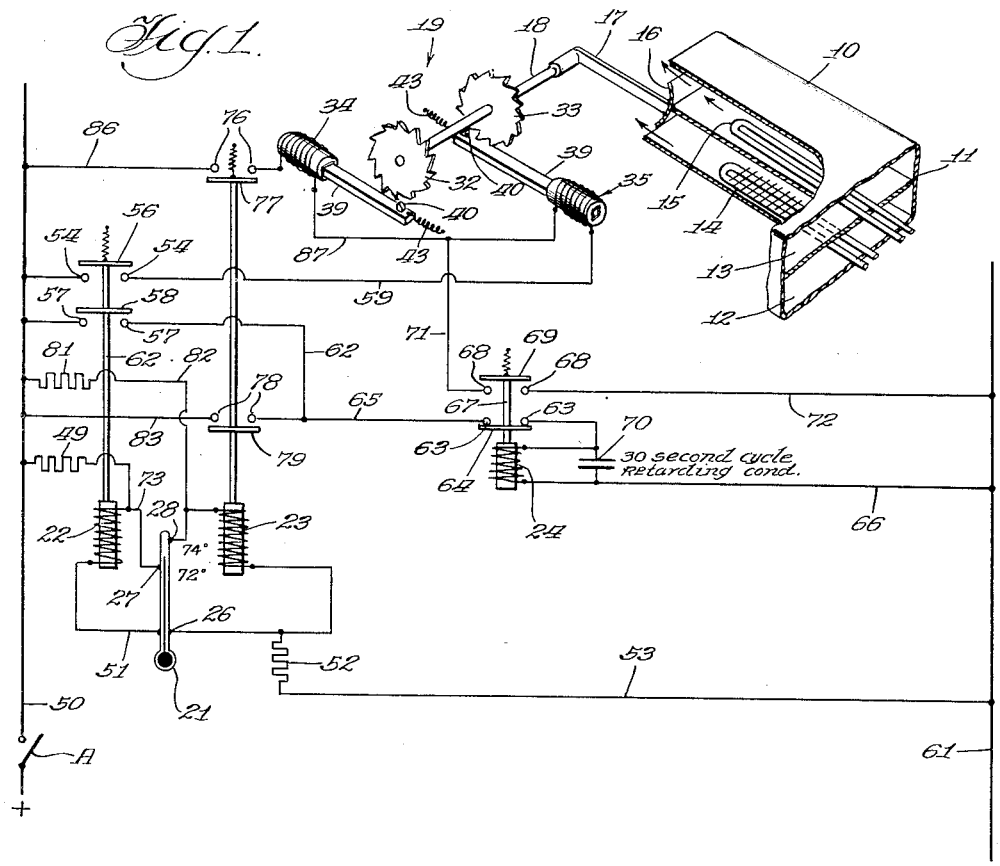
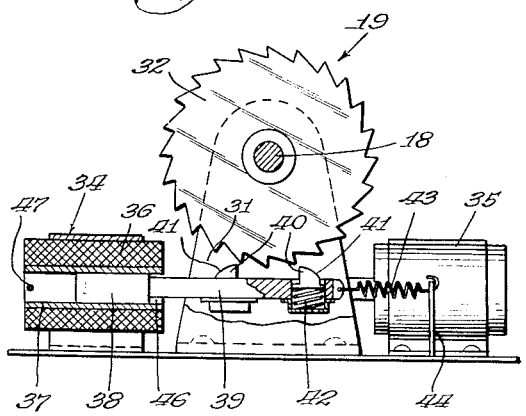
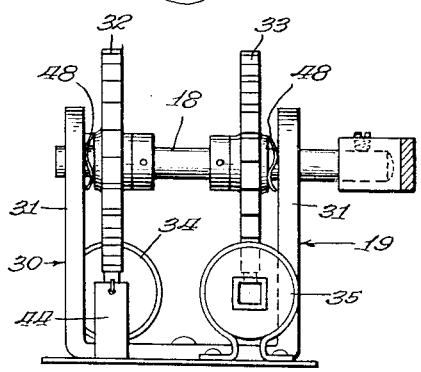
INVENTOR.
William M. Smith
BY
Harvey M. Gillespie
Atty Patented Dec. 30, 1952

2,623,699

UNITED STATES PATENT OFFICE 2,623,699

RELAY OPERATED TEMPERATURE RESPONSIVE CONTROL SYSTEM

William M. Smith, Glen Ellyn, Ill., assignor to Vapor Heating Corporation, Chicago, Ill., a corporation of Delaware Application July 1, 1949, Serial No. 102,563

5 Claims. (Cl. 236—77)

This invention relates to new and useful improvements in a temperature responsive control system.

A principal object of the invention is to provide a thermostatically controlled circuit suitable for automatically effecting modulated operation of means controlling the heating of a space so that the temperature thereof will be maintained substantially constant.

Another object of the invention is to provide a thermostatically controlled circuit of the above character which will be suitable for intermittently energizing a solenoid operated ratchet motor for modulating the position of a damper in an air delivery duct; the necessary intermittent or cycling action of the circuit being obtained through the use of a delayed action relay.

Other and further objects and advantages of my invention will be apparent from the following description when considered in connection with the accompanying drawings in which:

Fig. 1 is a diagrammatic view of a means for heating or cooling an enclosed space, together with a control circuit for modulating the position of a damper for controlling the supply of heated and/or cooled air to the said space.

Fig. 2 is an elevational view, partly in cross section, showing a solenoid operated ratchet motor employed to adjust the position of a damper.

Fig. 3 is an end elevational view of the solenoid operated ratchet motor shown in Fig. 2.

Referring to Fig. 1 of the drawings, the numeral 10 designates generally a conduit for delivering air into a space whose temperature is being controlled. The said conduit is provided with a partition 11 which divides it into two separate passages 12 and 13. The passage 12 communicates with a heating means, not shown, while the passage 13 communicates with a cooling means. For purposes of illustration, the passage 12 is shown as having a heating element 14 disposed therein while the passage 13 is shown as having a cooling element 15. However, the cooling means can be omitted, when unheated air is sufficiently cool to provide a blended air stream of suitable temperature. A damper 16 is located within the conduit 10 to control the amount of heated and unheated air entering the space whose temperature is being controlled. The damper 16 may be of any suitable construction. It is shown herein, for purpose of illustration, as comprising a sheet-like member formed in a curved plane and mounted on an arm 17 which is rigidly fixed on a driving shaft 18. The damper 16 is movable with the shaft, and in one extreme position, only heated air can be introduced into the enclosed space, while in another extreme position only unheated air can be introduced into the space. However, whenever the said damper is in any intermediate position, both heated and unheated air are admitted into the space in proportions determined by the position of the damper.

The position of the damper is adjusted by intermittent movements by means of a solenoid operated ratchet motor, indicated generally by the numeral 19. The movements of said motor are controlled in relation to the temperature of the controlled space. If the temperature of the space is at a desired point the control motor 19 will remain inactive. However, if there should be a slight change in the temperature of the space, either up or down, the control motor 19 will be operated to effect an adjustment of the damper 16, in one direction or another, so as to increase or reduce the supply of heat to the space, as may be required to balance the control system.

The control circuit for operating the motor 19 and therefore modulating the position of the damper 16, comprises a thermostat 21 arranged in the space being controlled so as to be influenced in its operation by the temperature of the said space, relays 22 and 23, delayed action relay 24, solenoids 34 and 35 of motor 19 arranged in opposed relation, and conductors for connecting the above elements in a manner hereinafter described.

The thermostat 21 is preferably of the mercury column type and is constructed so as to function at predetermined temperatures. The thermostat is shown as having spaced contacts 27—28 which define the lower and upper limits of a temperature range; the lower limit, for purpose of illustration, may be 72° and the upper limit as represented by contact 28 may be 74°. The third contact 26 is placed at any suitable location so as to be engaged by the mercury column of the thermostat 21 during the normal operation of the control system.

The solenoid operated ratchet motor 19 may be of any approved construction and may take the form illustrated in Figs. 2 and 3. The said motor includes a substantially U-shaped bracket 30 in the upstanding legs 31, 31 of which is journaled the driving shaft 18. Fixed on the shaft 18 for rotation therewith are a pair of ratchet wheels 32 and 33 with the teeth of one arranged in a direction opposite the teeth of the other so that reversal in direction of rotation of the shaft 18 may be effected.

Arranged in opposed relation and cooperating with the ratchet wheels 32 and 33 are solenoids 34 and 35 respectively. Since, the said solenoids are identical in structure a description of one will be deemed sufficient. The solenoid 34 includes a coil 36 having a core opening 37 in which an armature 38 is received for sliding movement. The armature 38 is provided with an extension 39 which carries near the end thereof a tooth 40 adapted for engagement with a cooperating ratchet wheel 32. As will be clearly seen in Fig. 2, the tooth 40 is provided with an inclined surface 41 and is biased by a spring 42 so that the tooth 40 will operatively engage a tooth of the ratchet wheel 32 when moving in a direction towards the left, as viewed in Fig. 2, and will slide under a tooth of the ratchet wheel when moving in the opposite direction or towards the right. A tension spring 43 carried on an upstanding lug 44 is connected to the end of the armature extension 39 and normally serves to maintain the armature in the position shown in Fig. 2 which corresponds to a deenergized condition of the coil 36. The coil 36 is provided with a shoulder 46 around the core opening 37 which serves as a stop to limit the travel of the armature 38 when moving to the right, and is provided with a pin 47 at the opposite end of the core opening to limit the travel of the armature in the opposite direction. Suitable friction means, here in the form of a split resilient ring 48 is provided between the hub of each of the ratchet wheels and the upstanding leg 31 so as to prevent free rotation of the shaft 18 and inadverent displacement of the damper 16.

The manner in which movement of the damper 16 may be effected will be apparent from the following description of the specific circuits which may be in control during the operation of the system. Assuming that the damper 16 as shown in Fig. 1 is in a position to deliver equal amounts of heated and unheated air to the enclosed space and that the mercury column in thermostat 21 stands below the contact 27 which represents a temperature, in the space controlled, below the lower limit of the desired heat range, and indicates a requirement for heat in the said space. The manual closing of switch A establishes an energizing circuit through the coil of relay 22. This circuit leads from positive line 50 through resistor 49, coil of relay 22, conductor 51, thermostat contact 26, resistor 52, and thence through conductor 53 to negative line 61. The energization of the relay 22 causes the armature 62 thereof to move downwardly establishing contact between the points 54, 54 and contact bar 56, and points 57, 57 and contact bar 58, thus closing an energizing circuit to the coil of the delayed action relay 24. This coil energizing circuit leads from the positive line 50 through contacts 57, 57, contact bar 58, through conductors 62 and 65, contacts 63, 63, contact bar 64 of relay 24, through the coil of relay 24 and thence through conductor 66 to negative line 61.

Energization of the relay 24 effects engagement of the contacts 68, 68 with contact bar 69 establishing an energizing circuit through solenoid 35 which imparts an operating movement to its associated armature and effects through the movement of the ratchet wheel 33 a rotation of shaft 18 in a direction to increase the amount of heated air and to reduce the amount of unheated air delivered into the space.

The coil of relay 24 has a retarding condenser 70 connected in parallel therewith, the said condenser operating, in this instance, on a cycle of thirty seconds. As soon as the relay 24 loses its residual energy, the armature 67 is released and moves back to non-energized position, as shown in Fig. 1, effecting disengagement of contacts 68, 68 and contact bar 69, thus opening the circuit to the solenoid 35. Engagement between the contacts 63, 63 and contact bar 64 is again effected, and the energizing circuit through the coil of solenoid 24 is thus reestablished causing the armature 67 to move downwardly to again effect engagement between the contacts 68, 68 and contact bar 69. Again, after a delayed interval of thirty (30) seconds, solenoid 24 loses its residual energy and the armature 67 moves to non-energized position effecting a reestablishment of the energizing circuit through solenoid 35 imparting an operating movement to its armature and rotating the shaft 18 as hereinbefore described. Thus, in operation the solenoid 35 is intermittently energized and the armature thereof imparts corresponding impulses to the ratchet wheel 32. Movement of the ratchet wheel effects through the shaft 18 a corresponding movement of the damper 16 in a direction to increase the amount of heating air delivered into the space. It will be apparent that the motor energizing circuit is maintained only momentarily and consequently the damper will be adjusted by a series of intermittent movements until the proportions of heated and cooled air passing through the duct 10 are such as to increase the temperature of the space and thereby cause the mercury column of the thermostat 21 to rise to a position advancing toward contact 27 of the thermostat. The above described cycling action will continue until the ratchet motor 19 has been operated sufficiently so as to adjust the damper 16 to a position to maintain a desired temperature within the space.

Assuming now that the heating requirements for the space have been satisfied and that the mercury column of thermostat 21 has risen to a point between contacts 27 and 28 thereof. In this condition, the current from positive line 50 following the path of least resistance bypasses the coil of relay 22 and follows through resistance 49, conductor 73, contact 27, through the mercury column of the thermostat, through contact 26, resistance 52, through conductor 53 and thence to negative line 61. Thus, the relay 22 is by-passed and is not energized and consequently solenoid 35 remains inactive and the position of the damper 16 remains unchanged.

Assuming now that the mercury column in thermostat 21 has risen to a point above contact 28 which represents a condition above the temperature range desired in the space. As will be apparent by tracing the circuit, the relay 23 normally is energized with its armature in the position as shown in Fig. 1, that is, with the contacts 76, 76 disengaged from the contact bar 77, and contacts 78, 78 disengaged from contact bar 79. The energizing circuit for the coil of relay 23 leads from positive line 50 through resistance 81, conductor 82, through relay 23, resistance 52, through conductor 53, and thence to negative line 61. When however, the mercury column has risen to or beyond contact 28 the coil of relay 23 is by-passed, the current passing from positive line 50, through resistance 81, conductor 82, contact 28, through the mercury column of thermostat 21, through contact 26, resistance 52, through conductor 53, and thence to negative line 61. The relay 23 is thus de-energized and the armature is caused to move upwardly effecting engagement of the contacts 76, 76 with contact bar 77, and contacts 78, 78 with contact bar 79. It will be apparent that upon engagement of contacts 78, 78 with contact bar 79, an energizing circuit through relay 24 is established, the energizing circuit leading from positive line 50, through conductor 83, contacts 78, 78, contact bar 79, conductor 65, contacts 63, 63, contact bar 64, through the coil of relay 24, through conductor 66 and then to negative line 61. This energization of the relay 24 effects a downward movement of the associated armature 67 effecting engagement of contacts 68, 68 with contact bar 69 and establishing an energizing circuit through the solenoid 34. The energizing circuit leads from positive line 59 through conductor 86, contacts 76, 76 and contact bar 77, through the coil of solenoid 34, conductor 87, conductor 71, through contacts 68, 68 and contact bar 69, through conductor 72 and thence into negative line 61. Similarly, as in the case of solenoid 35, the energization of the solenoid 34 imparts an operating movement to its armature which causes the ratchet wheel 32 to advance one tooth. The operating movement however, is in a reverse direction so that the shaft 18 correspondingly imparts a reverse movement to the damper 16 in a direction to increase the delivery of cooled air and to decrease the delivery of heated air to the space. Similarly, as hereinbefore described with respect to the operation of solenoid 35, the relay 24 after thirty seconds loses its residual energy releasing the armature 67 so that it moves upwardly, effecting disengagement of the contact bar 69 with the contacts 68, 68 thereby opening the circuit to solenoid 34. The circuit through the solenoid 34 is again reestablished imparting an operating movement to the damper 16. The same cycling action continues until the mercury column in thermostat 21 has dropped below contact 28.

It will be apparent that I have provided simplified automatic means for adjusting a control damper for proportionately varying the amount of heated and unheated air, the necessary cycling or intermittent opening and closing of the circuit being accomplished through the use of a solenoid operated ratchet motor in circuit with a delayed action relay.

I claim:

1. The combination with a means for altering the temperature of an enclosed space including a valve movable to different positions to vary the effectiveness of said temperature altering means, of mechanism for imparting adjusting movements to said valve including a first solenoid for activating said mechanism in one direction, a first relay for partially closing an energizing circuit through said first solenoid, a second solenoid for activating said mechanism in the opposite direction, a second relay for partially closing an energizing circuit through said second solenoid, a third relay cooperating with said first and second relays and adapted, when energized, to selectively close one of said partially closed circuits to energize one of said solenoids, alternative energizing circuits connected through said first and second relays for energizing said third relay, and electrically energized means connected in the energizing circuit of said third relay for maintaining it energized for a predetermined time period.

2. The combination defined in claim 1 characterized in that the mechanism activated by the first and second solenoids is a reversible ratchet motor and in that the said means for maintaining the third relay energized is effective to automatically de-energize the same at the end of said predetermined time period.

3. The combination of claim 2 characterized by the provision of a thermostat responsive to the temperature of the enclosed space and having spaced contacts defining the lower and upper limits of a predetermined temperature range, one contact being connected in shunt with the winding of the first relay and the other contact being connected in shunt with the winding of the second relay.

4. The combination of claim 3 characterized in that the electrically energized means for maintaining the third relay energized for a predetermined time period is a condenser connected in shunt relation with the winding of said third relay.

5. The combination of claim 4 characterized in that the third relay is provided with a de-energized closed contact and in that said alternative circuits for energizing said third relay are selectively closed by said first and second relays in cooperation with said de-energized closed contact of the third relay.

WILLIAM M. SMITH.

REFERENCES CITED

The following references are of record in the file of this patent:

UNITED STATES PATENTS

| Number | Name | Date |
|---|---|---|
| 1,618,828 | Jones | Feb. 22, 1927 |
| 2,300,537 | Davis | Nov. 3, 1942 |
| 2,366,500 | Eastin | Jan. 2, 1945 |
| 2,367,741 | Smith | Jan. 23, 1945 |
| 2,382,073 | Lehane et al. | Aug. 14, 1945 |